(12) United States Patent
Terry et al.

(10) Patent No.: US 8,486,314 B1
(45) Date of Patent: Jul. 16, 2013

(54) METHOD OF INTERNALLY RESTORING A LEAKING PIPE

(71) Applicants: Roy A. Terry, Laguna Niguel, CA (US); Ryan A. Terry, Trabuco Canyon, CA (US); Michael T. Terry, Laguna Niguel, CA (US)

(72) Inventors: Roy A. Terry, Laguna Niguel, CA (US); Ryan A. Terry, Trabuco Canyon, CA (US); Michael T. Terry, Laguna Niguel, CA (US)

( * ) Notice: Subject to any disclaimer, the term of this patent is extended or adjusted under 35 U.S.C. 154(b) by 0 days.

(21) Appl. No.: 13/710,539

(22) Filed: Dec. 11, 2012

(51) Int. Cl.
 *B05D 7/22* (2006.01)

(52) U.S. Cl.
 USPC ............... 264/36.16; 264/36.1; 264/36.15

(58) Field of Classification Search
 USPC .................. 264/36.1, 36.15, 36.16
 See application file for complete search history.

(56) References Cited

U.S. PATENT DOCUMENTS

| | | | | |
|---|---|---|---|---|
| 3,750,711 | A * | 8/1973 | Conklin et al. | 138/97 |
| 5,622,209 | A | 4/1997 | Naf | |
| 5,931,198 | A * | 8/1999 | Raji et al. | 138/98 |
| 6,382,876 | B2 * | 5/2002 | Lee et al. | 405/184.2 |
| 6,739,950 | B1 | 5/2004 | Kruse | |
| 7,858,149 | B2 * | 12/2010 | Gillanders et al. | 427/230 |
| 8,033,242 | B2 | 10/2011 | Gillanders et al. | |
| 8,354,140 | B2 | 1/2013 | Gillanders et al. | |
| 8,399,813 | B2 | 3/2013 | Gillanders et al. | |

OTHER PUBLICATIONS

Robert F. Brady, Jr. and James D. Adkins, Control of Lead in Drinking Water, published Jul. 11, 1997.

* cited by examiner

*Primary Examiner* — Galen Hauth
(74) *Attorney, Agent, or Firm* — Donald J. Ersler

(57) ABSTRACT

A method of internally restoring a pipe preferably includes the steps of isolating a leaking pipe from a system of pipes; drying an interior of a leaking pipe; measuring the airflow through the leak; cleaning the interior of the leaking pipe; pre-sealing a leak with a leak sealing media, measuring the leak flow rate after the pre-sealing; applying an internal protective coating process; and pressure testing the leaking pipe for leaks. The pipe restoration method preferably uses a control box, a media injection system, an air compressor and a coating dispensing system at an inlet of the leaking pipe. The pipe restoration method preferably uses a coating overflow receiver, a muffler and a dust collector at an exit of the leaking pipe. After the treatments, the leaking pipe becomes a restored pipe. The restored pipe is pressure tested for leaks at a working pressure rating of the pipe and reconnected to its piping system.

20 Claims, 5 Drawing Sheets

METHOD OF INTERNALLY RESTORING A LEAKING PIPE

BACKGROUND OF THE INVENTION

1. Field of the Invention

The present invention relates generally to pipes and more specifically to a method of internally restoring a pipe, which provides a cost effective alternative to replacing or making exterior repairs to the pipe.

2. Discussion of the Prior Art

A method of restoring small diameter pipe systems (the Process), utilizing compressed air for cleaning and internal coating pipes, has been well known worldwide since at least the late 1970's. The Toyo Lining Company received an approval from the Japanese government to restore water pipe systems in 1981. Since 1987, the Naval Research Laboratory has been involved in the development and testing of coatings for the in-place lining of piping systems. The process is commonly known as the "Air-Sand" lining process and has been utilized by the Navy to restore and protect the piping in its ships and land-based facilities, both commercial and residential.

The real life application of the process to restore aging building water systems has had many challenges. These challenges are well documented within the US Navy report titled 'Control of Lead in Drinking Water' from 1997 among others. The difficulty of insuring that the dry sandblasting material is cleared from the pipe system after the cleaning operation; restriction and plugging of pipe tee's and pipe intersections with excess coating material; and the inability of the process to seal leaks is well known to those in the art.

To seal other than the smallest of leaks in systems of pipes with the Process has not been possible. Compressed air application of an internal liquid epoxy coating results in the coating being forced out the leak opening without sealing the leak. U.S. Pat. No. 6,739,950 to Kruse states in col. 6, lns. 51-52 that 'If major leaks are discovered, a repair is performed prior to starting the pipe coating procedure.' The Navy literature also teaches the repair of leaks before application of internal coatings.

More recently alternate methods for sealing leaks in systems of pipes installed within buildings have been taught. U.S. Pat. No. 5,622,209 to Naf discloses a process for sealing and internal repair of systems of laid conduits. The Naf process is implemented by flooding the piping system with water and a mixture of fillers including water swellable bentonite. If the known problem of clearing the dry cleaning media proved problematic in the prior art, the removal of the bentonite and filler loaded solution suggested by Naf would be at least equally a challenge if not impossible. It will not be practical to clear a pipe system once this material is introduced and allowed to set to the point of sealing the leaks. The uncleared sealing media taught by Naf will necessarily result in restricted and plugged pipe sections.

U.S. Pat. Nos. 7,858,149 and 8,033,242 to Gillanders et al. both disclose methods and systems for coating and sealing inside piping systems in one step. Claims are made that the addition of fiber and other fillers to the liquid coating material in ratios up to 50% by volume will seal holes up to 0.125" (⅛") during the process of internal coating of the pipe system. One skilled in the art understands that during the compressed air application of liquid epoxy to the inside of a small diameter pipe any filler included in the liquid epoxy will be separated by the action of the airflow and moved to the front of the lining stream. In the process of coating the inside of small diameter water pipe systems in houses and commercial buildings, liquid coating is injected with compressed air from multiple inlet points progressing toward a single outlet. The individual 'shots' of coating material introduced into each successive outlet are not measured to clear the system of pipes, just to coat an individual portion of the system, thus the filler load of each 'shot' of coating will remain within the system causing a significant reduction in internal pipe diameter, compromise the intended lining thickness, and result in an inferior finished product.

Accordingly, there is a clearly felt need in the art for a method of internally restoring a leaking pipe, which provides a cost effective alternative to replacing or making exterior repairs to a pipe, and which utilizes airflow measurements and airflow control inside a pipe to optimize the repair of a leak with the application of an internal restoration coating.

SUMMARY OF THE INVENTION

The present invention provides a method of internally restoring a pipe, which utilizes airflow measurements inside a pipe to optimize the processes of leak sealing and application of the internal protective coating. The method of internally restoring a leaking pipe (pipe restoration method) preferably includes the steps of separating a leaking pipe from a system of pipes, drying an interior surface of a leaking pipe; measuring the airflow through the leak; cleaning the interior surface of the leaking pipe; pre-sealing a leak with a dry leak sealing process, measuring the leak flow rate after the pre-sealing; applying an internal protective coating; and pressure testing the leaking pipe for leaks.

The pipe restoration method preferably uses an air compressor, an air dryer, a control box, a media injection device and a coating injection System at an inlet of the leaking pipe. The pipe restoration method preferably uses a coating overflow receiver, a test valve, a muffler and a dust collector at an exit of the leaking pipe. The control box preferably includes a plurality of process control and measuring capabilities including an airflow meter, multiple airflow control valves, an inlet pressure gauge, an outlet pressure gauge, inline heating elements, a process heat controller and various safety features for protection from overheat and overpressure. The media injection device includes a media reservoir, a media introduction control valve, an air inlet, an air outlet and a flexible system connection assembly. The air dryer includes a radiator, a fan, a water separator and a heat exchanger. The air compressor and the liquid coating dispensing system both can be purchased from any number of manufacturers.

The air compressor is connected to an air inlet of the air dryer; an outlet of the air dryer is connected to the inlet of the control box; and the outlet of the control box is connected to an air inlet of the clear inlet tube. The clear inlet tube is preferably inserted before an inlet of the leaking pipe. The media injection device and the coating injection system are preferably installed between the outlet of the control box and inlet of the clear inlet tube. The interior surface of the leaking pipe is dried by the flow of heated compressed air delivered through the control box.

The airflow through a leak is measured with the air flow meter in the control box. The interior surface of the leaking pipe is cleaned by flowing sand blast media through the leaking pipe, which is dispensed by the media injection device. The leak in the leaking pipe is pre-sealed by injecting a dry leak sealing media into the air stream with the media injection device. The airflow rate through the leak in the pipe is measured, after completion of the pre-sealing process, with the control box. The pre-sealing with dry leak-sealing media and airflow rate are repeatedly measured, until the airflow rate through the leak in the pipe is reduced below the requirement for the internal coating process. A plug of liquid coating is injected into the clear inlet tube with the coating injection device and forced through an interior surface of the leaking pipe with air from the air compressor. The control box heats airflow and controls a volume of airflow from the air compressor. Excess liquid coating is caught in the coating overflow receiver at an outlet of the leaking pipe. The air exiting the restored pipe is filtered with the dust collector and the sound of the air exiting the leaking pipe is muffled with a muffler. After the treatments, the leaking pipe becomes a restored pipe. The restored pipe is pressure tested for leaks at a working pressure rating for the restored pipe. Finally, the restored pipe is reconnected to its piping system.

Objectives of the Invention

Accordingly, it is an objective of the present invention to provide a pipe restoration method, which provides a cost effective alternative to replacing or making exterior repairs to a pipe located within the concrete floors, or wall systems, of buildings.

It is another objective of the present invention to provide a pipe restoration method, which determines the size of a leak in a pipe.

It is a further objective of the present invention to provide a pipe restoration method, which surveys a pipe for existing damage that restricts flow through the pipe.

It is yet a further objective of the present invention to provide a pipe restoration method for internally cleaning a pipe.

It is yet a further objective of the present invention to provide a pipe restoration method, which pre-seals a leak with dry leak sealing media containing metal fibers and flakes within a blend of cellulose fibers.

It is yet a further objective of the present invention to provide a pipe restoration method, which precisely measures and controls the volume of airflow through a pipe.

It is yet a further objective of the present invention to provide a pipe restoration method, which precisely controls the temperature of the airflow through a pipe.

It is yet a further objective of the present invention is to provide a pipe restoration method, which applies an internal protective coating to a pipe wherein the application of the coating is regulated by precise control of airstream volume and temperature.

It is a final objective of the invention is to provide methods, systems and devises to force the cure of the internal protective coating with a heated airflow.

These and additional objects, advantages, features and benefits of the present invention will become apparent from the following specification.

DETAILED DESCRIPTION OF THE PREFERRED EMBODIMENTS

Figure 1:
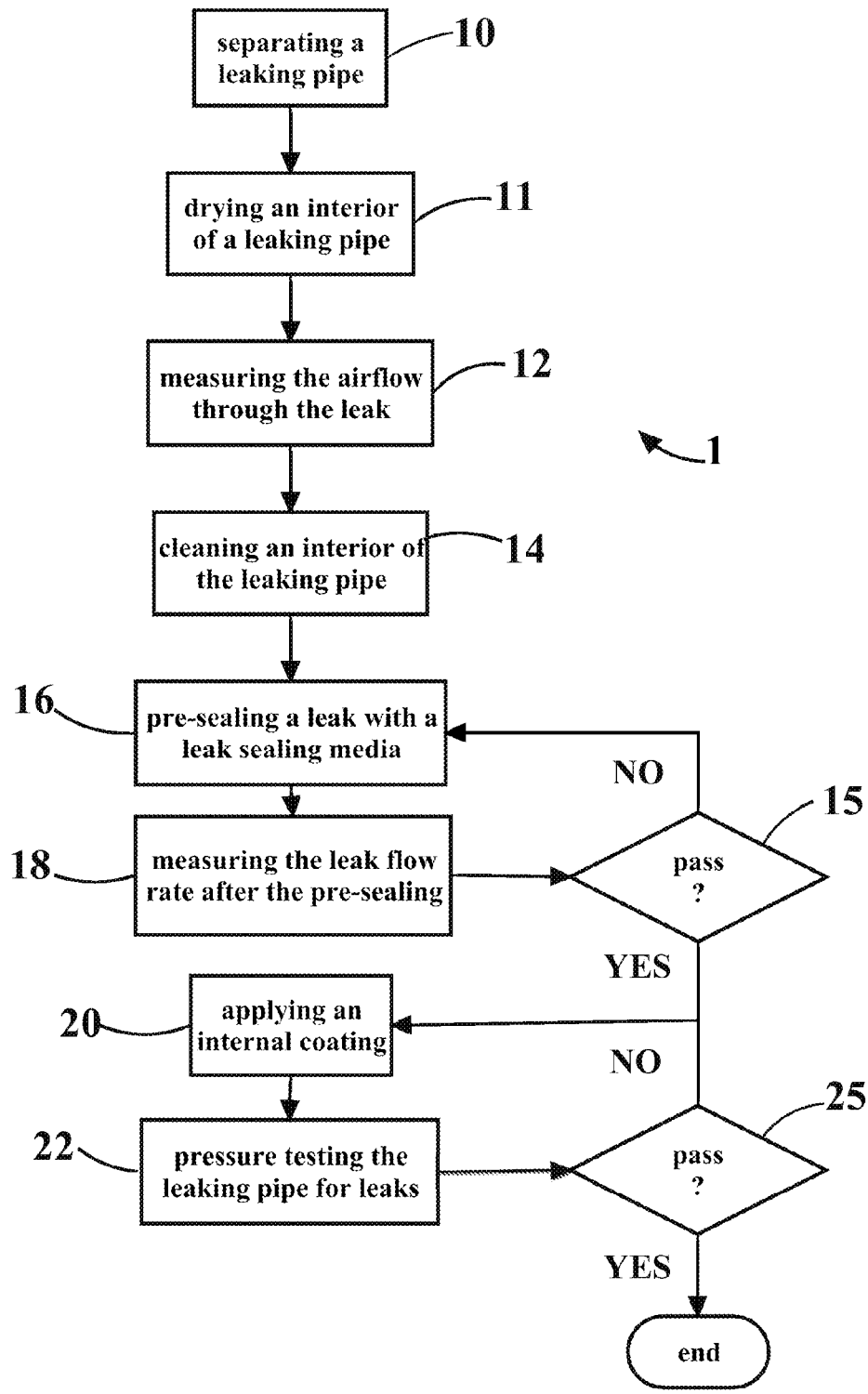
FIG. 1 is a flow chart of a pipe restoration method in accordance with the present invention.
Figure 2:
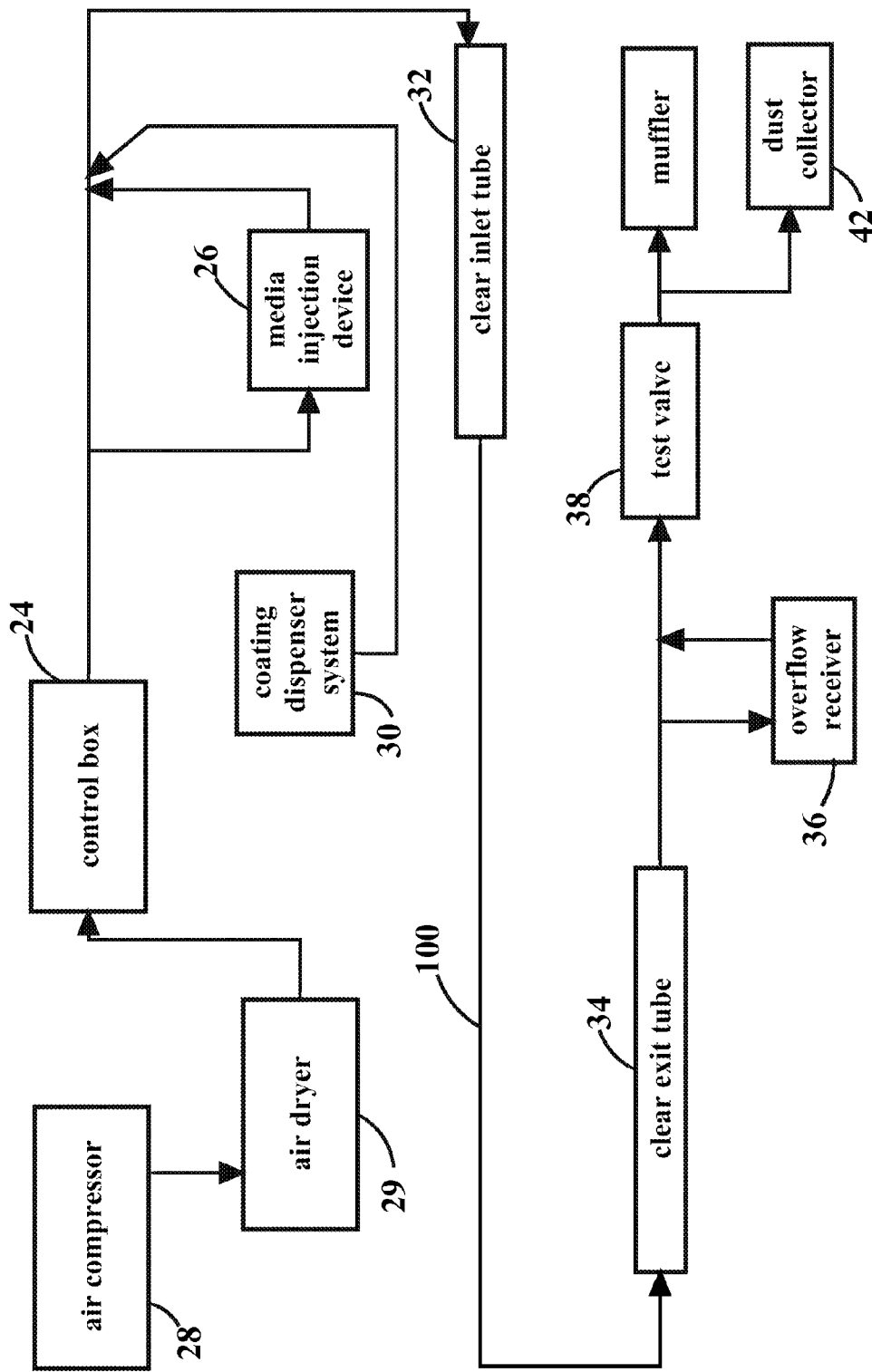
FIG. 2 is a schematic diagram of a pipe restoration method in accordance with the present invention.

With reference now to the drawings, and particularly to FIG. 1, there is shown a flow chart of a pipe restoration method 1. With reference to FIG. 2, the pipe restoration system 1 has been found to be satisfactory in repairing a leaking pipe 100, which is a part of a system of pipes for carrying pressurized water in a building. The leaking pipe 100 is commonly encased with a concrete foundation or floor of the building. The leaking pipe is typically a soft copper water pipe experiencing pinhole leaks due to internal pitting corrosion and the leaking pipe 100 is between ½" and 2" in diameter. However, the pipe restoration method 1 should not be limited to the previously recited parameters.

Figure 3:
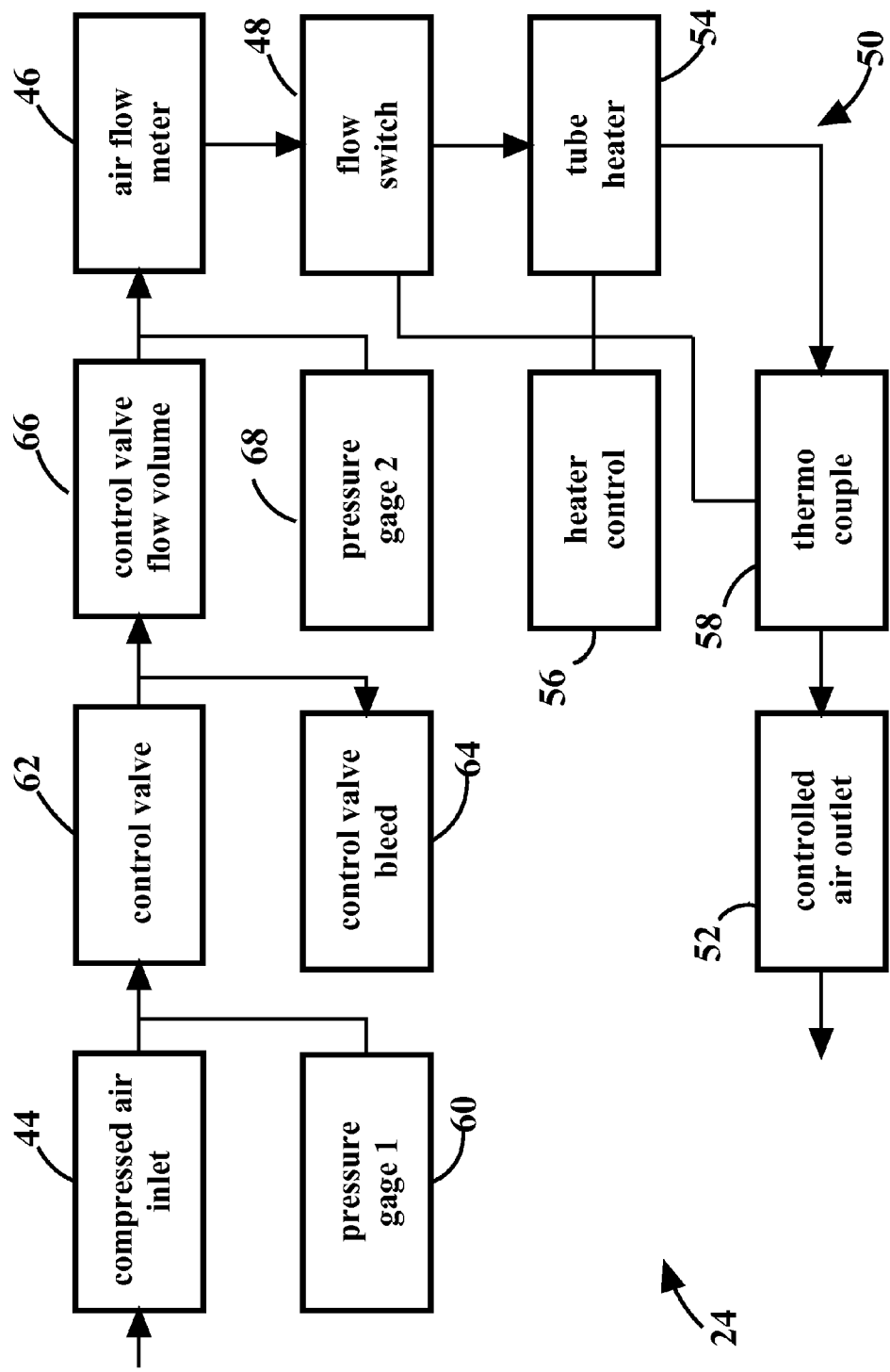
FIG. 3 is a schematic diagram of a control box of a pipe restoration method in accordance with the present invention.
Figure 4:
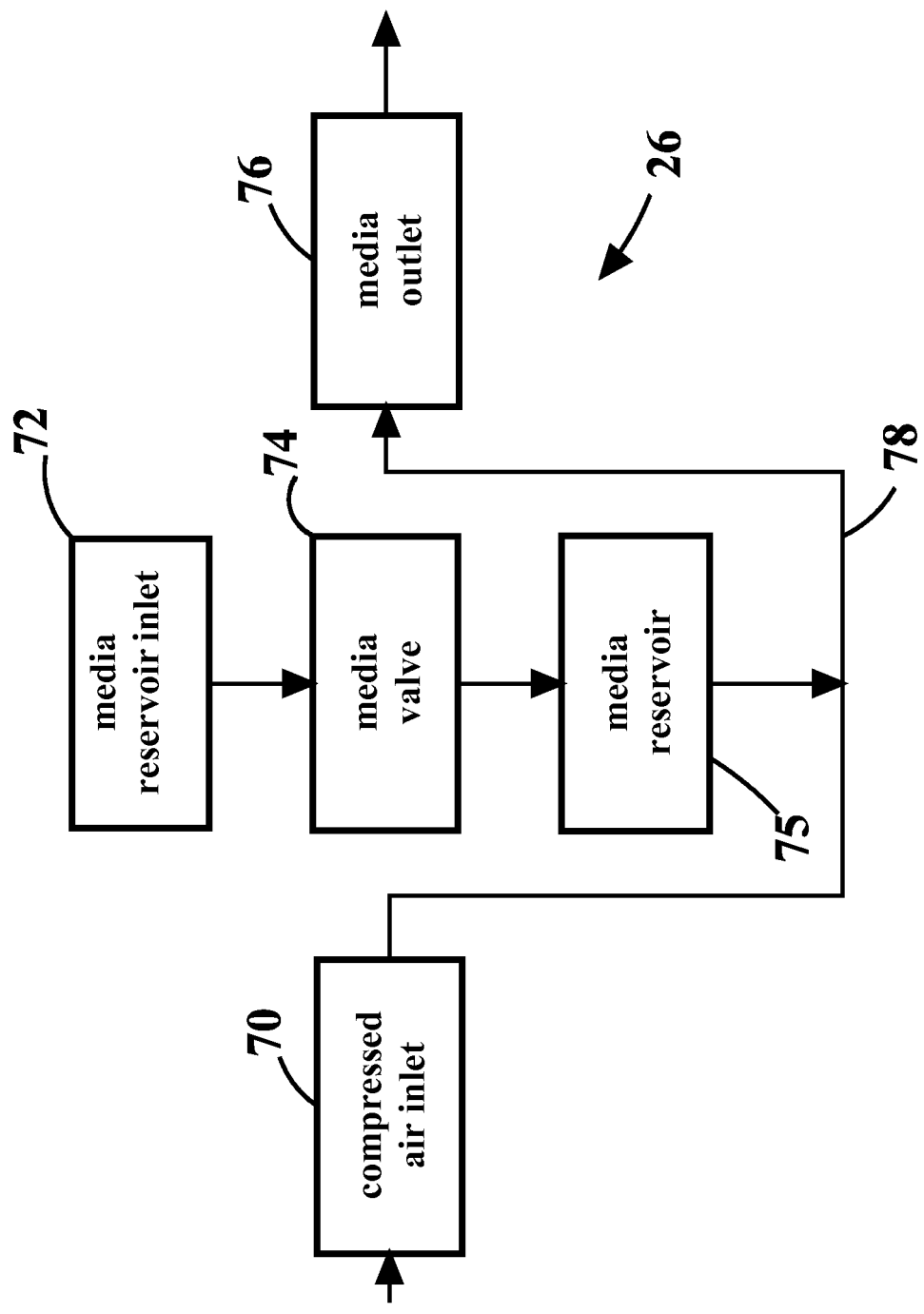
FIG. 4 is a schematic diagram of an injection system of a pipe restoration method in accordance with the present invention.

With reference to FIGS. 3-4, the pipe restoration method 1 preferably includes the steps of separating a leaking pipe from a system of pipes in process block 10, drying an interior surface of a leaking pipe in process block 11; measuring the airflow through the leak in process block 12; cleaning an interior surface of the leaking pipe in process block 14; pre-sealing a leak with a dry leak sealing media in process block 16, measuring the leak flow rate after the pre-sealing in process block 18; applying an internal coating in process block 20; and pressure testing the leaking pipe for leaks in process block 22. The leaking pipe 100 is isolated from the system of pipes by opening wall surfaces in the building, where the pipe exits the foundation at each end of the pipe and dissecting the connection manifolds to expose the ends to receive the restoration process.

The pipe restoration method 1 preferably uses a control box 24, a media injection system 26, an air compressor 28, an air dryer 29, a coating dispensing system 30 and a clear inlet tube 32 at an inlet of the leaking pipe 100. The compressor preferably generates airflow with a pressure up to 175 psi at a flow rate of 375 cfm. The pipe restoration method 1 also preferably includes a clear exit tube 34, a coating overflow receiver 36, a test valve 38, a muffler 40 and a dust collector 42 at an outlet of the leaking pipe 100. The control box 24 preferably includes an air inlet 44, a plurality of air flow control valves, two pressure gages, an air flow meter 46, a flow switch 48, a heater unit 50 and an air outlet 52. The heater unit 50 includes a tube heater 54, a heater controller 56 and a thermocouple 58. An output of the air compressor 28 is connected to the compressed air inlet 44. A first pressure gage 60 measures the pressure of the air from the air compressor 28. A control valve 62 may be used to shut-off airflow through control box 24.

A control bleed valve 64 allows excess air to be bled from the control box 24. An air volume flow valve 66 is used to control the volume of air traveling through the leaking pipe 100. A second pressure gage 68 is used to measure the pressure of the airflow at the output of the air volume flow valve 66. The air flow meter 46 provides a reading of the volume of airflow (preferably measured in cubic feet per minute (cfm) flowing from the air volume flow valve 66. The heater controller 56 operates the tube heater 54 based on feedback from the thermocouple 58. The flow switch 48 is operated by the heater controller 56. The flow switch 48 detects an airflow interruption. The heater controller 56 turns-off the heater unit 50 if an airflow interruption occurs.

The media injection device 26 includes an air inlet 70, a media reservoir inlet 72, a media valve 74, a media reservoir 75, a media outlet 76 and a flow tube 78. The air inlet 70 is connected to the outlet 52 of the control box 24 during the cleaning and pre-sealing operations. The control valve 66 controls airflow through the media injection device 26. Sand blast media is poured into the media reservoir inlet 72. The sand blast media flows into the media reservoir 75 and then the media valve 74 is opened. The sand blast media flows into the flow tube 78 and is transported through the media injection device 26 by airflow from the control box 26. The sand blast media preferably 23-30 garnet for copper water lines. The media reservoir 74 is filled with media for cleaning and pre-sealing an inside of the leaking pipe 100. The media outlet 76 is coupled to one end of the clear inlet tube 32. An outlet of the coating dispensing system 30 is coupled to the one end of the clear inlet tube 32. Both the air compressor 28 and the coating dispensing system 30 can be purchased from any number of manufacturers.

Figure 5:
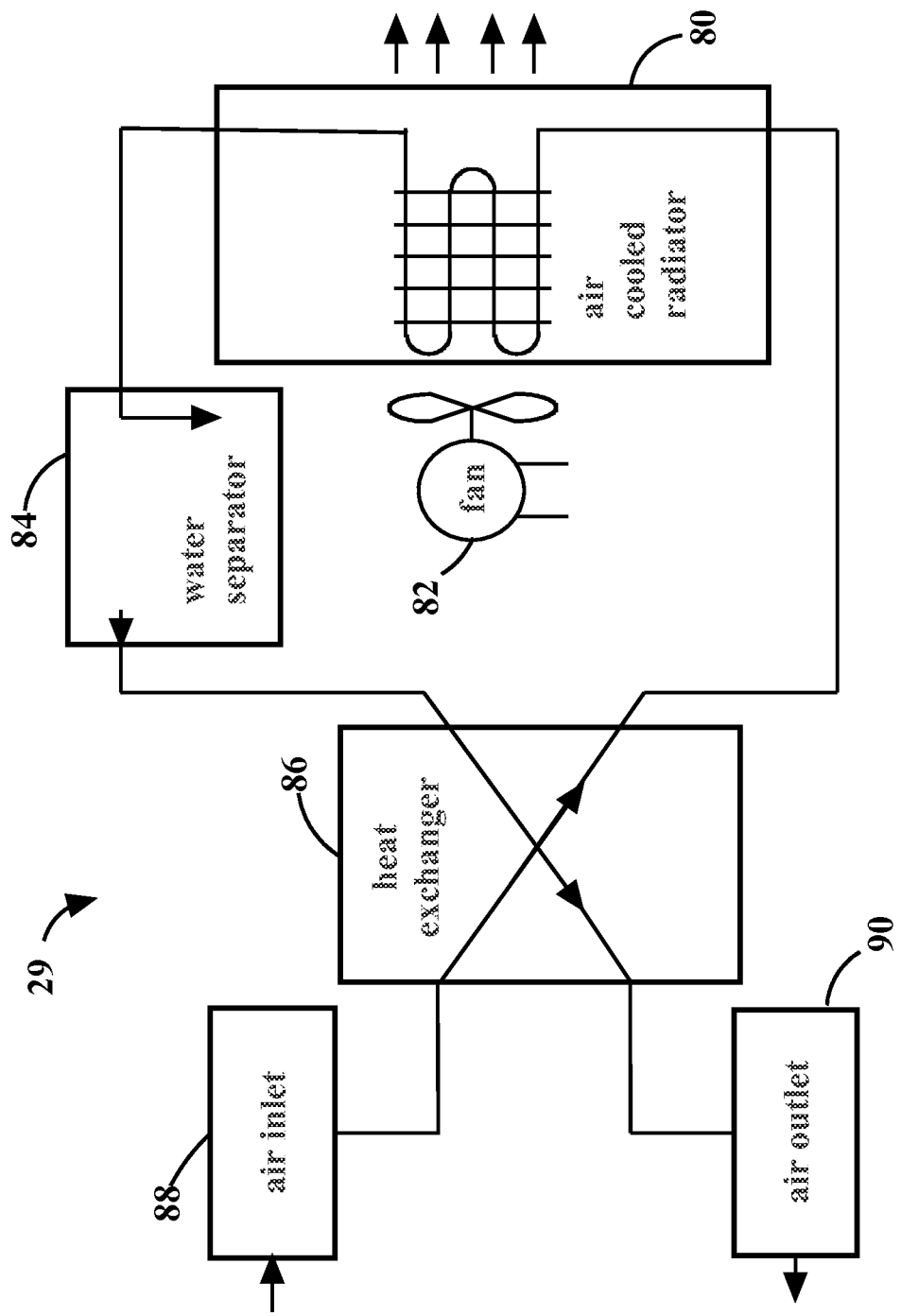
FIG. 5 is a schematic diagram of an air dryer of a pipe restoration method in accordance with the present invention.

With reference to FIG. 5, the air dryer 29 preferably includes a radiator 80, a fan 82, a water separator 84 and a heat exchanger 86. The air compressor 28 is connected to an air inlet 88 of the air dryer 29; an outlet 90 of the air dryer 29 is connected to the inlet 44 of the control box 24; and the outlet 52 of the control box 29 is connected to an air inlet of the clear inlet tube 32. The clear inlet tube 32 is preferably inserted before an inlet of the leaking pipe 100. The media injection device 26 is preferably installed between the outlet of the control box 24 and inlet of the clear inlet tube 32.

The other end of the clear inlet tube 32 is connected to an inlet of the leaking pipe 100. One end of the clear exit tube 34 is connected to an outlet of the leaking pipe 100. The other end of the clear exit tube 34 is coupled to the coating overflow receiver 36 and an inlet of the test valve 36. An outlet of the test valve 38 is connected to the muffler 40 and the dust collector 42. Excess liquid coating material and leak sealing media is caught in the coating overflow receiver 36. The air exiting the leaking pipe 100 is filtered with the dust collector 42 and the sound of the air exiting the leaking pipe is muffled with a muffler 40.

To begin the repair process, the leaking pipe 100 is isolated from the building or other piping systems in building in process block 10. The interior surface of the leaking pipe 100 is dried by flowing dry compressed air through the control box 24 in process block 11. A temperature of the air is preferably between 100° F. and 130° F. and the airflow volume is up to 250 cfm for a 2¼ inch diameter pipe. The tube heater 24 heats the compressed air. Airflow through the leaking pipe 100 is measured by the airflow meter 46 in the control box 24 and by closing the test valve 38 in process block 12. A dry leak sealing media is chosen based on air volume flow readings. The dry leak-sealing media preferably includes a mixture of cellulose fibers combined with fine metal fibers and metal flakes. The interior surface of the leaking pipe 100 is cleaned by injecting sand blast media there through in controlled bursts from the media injection device 26 in process block 14.

The leak in the leaking pipe 100 is pre-sealed by injecting the selected dry leak sealing media with the media injection device 26 in process block 16. The flow rate through the leak in the leaking pipe 100 is measured with the airflow meter 46 and by closing the test valve 38 in process block 18. In decision block 15, if the volume of airflow through the leak is reduced below the requirement for the liquid coating application then proceed to process block 20, if not repeat the pre-sealing in process block 16.

A liquid corrosion protection coating is applied in process block 20. The coating is preferably a plural component liquid epoxy, but other substances may also be used. The coating is certified for contact with drinking water when used in water pipes. The coating is applied by injecting a metered amount of coating at a specific airflow rate and temperature, selected for the leaking pipe 100, based on an inner diameter of the leaking pipe 100. The liquid coating is dispensed as a "plug" or "shot" of material into the clear inlet tube 32 in a volume calculated to ensure that the entire inner perimeter of the leaking pipe 100 is coated and excess fillers and coating material are carried into the coating overflow receiver 36. The liquid coating may contain up to 2% by weight of various glass fibers and flake fillers dependent on the reduced leak airflow measurements. The liquid coating is force cured to a test hardness by airflow heated by the tube heater 54. A temperature of the liquid coating is controlled by the heater control 56, and the airflow is regulated by the airflow control valve 66, until the test hardness is obtained. The liquid coating is pre-heated before introduction into the leaking pipe to a temperature preferably between 100° F. and 130° F. to control the viscosity thereof The liquid coating introduced into the leaking pipe 100 is determined by a pipe length and a specified coating thickness. The liquid coating may contain fillers of up to 2% glass fibers and flakes by weight as a sealant for small holes. The liquid coating is applied to the inside diameter of the leaking pipe 100 with a stream of air. The stream of air is heated to a preferable temperature of between 100° F. and 130° F. The precise temperature of the air stream is determined by the type of liquid coating. The control box 24 provides a preferable flow rate of the air stream between 0.05 and 375 cfm. The flow rate of the air stream is determined by a combination of pipe diameter and liquid coating selection.

Using hot air forced cure reduces the time to obtain test hardness. A temperature of the forced air is preferably between 100° F. and 130° F. with a volume of air preferably between 10CFM and 40CFM as controlled by the control box 24. For example, a cure time for a specified epoxy coating at room temperature (72 degrees) takes 6 hours. Flowing heated air through an interior surface of the coated leaking pipe 100 will heat the liquid epoxy coating and reduce the cure time. For each 10° C. the coating is heated above 72° F., the cure time to testing hardness is reduced by 50%.

The leaking pipe 100 is now a restored pipe 100. The restored pipe 100 is pressure tested for leaks at the working pressure rating of the pipe in process block 22 by closing the test valve 38 and measuring the pressure on the second pressure gage 68. In decision block 25, if the restored pipe 100 passes the pressure test, the restored pipe 100 is restored to service per the liquid coating "return to service" guidelines and the process is ended. If the restored pipe 100 fails the pressure test, the liquid coating process in process block 20 is repeated per liquid coating "film thickness" specifications.

While particular embodiments of the invention have been shown and described, it will be obvious to those skilled in the art that changes and modifications may be made without departing from the invention in its broader aspects, and therefore, the aim in the appended claims is to over all such changes and modifications as fall within the true spirit and scope of the invention.

We claim:

1. A method of internally restoring a pipe, comprising the steps of:
   drying an interior surface of a leaking pipe;
   measuring air flow through at least one leak in the leaking pipe;
   cleaning the interior surface of the leaking pipe;
   pre-sealing the at least one leak with a dry leak sealing media by injecting the dry leak sealing media through an inlet of the leaking pipe;
   injecting through the inlet a metered amount of heated liquid coating into the interior surface at a specific air flow rate selected according to an inner diameter of the leaking pipe, to form a restored pipe; and
   testing the restored pipe by pressurizing thereof.

2. The method of internally restoring a pipe of claim 1, further comprising the step of:
   reducing curing time of the liquid coating by flowing heated air through the interior surface of the restored pipe.

3. The method of internally restoring a pipe of claim 1, further comprising the step of:
  adding fillers to the liquid coating, wherein the amount of said fillers are dependent upon the reduced leak air flow measurements.

4. The method of internally restoring a pipe of claim 1, further comprising the step of:
  inserting a clear tube before an inlet of the leaking pipe.

5. The method of internally restoring a pipe of claim 1, further comprising the step of:
  using a sand blasting media to clean the interior surface of the leaking pipe.

6. The method of internally restoring a pipe of claim 1, further comprising the step of:
  providing a control valve to vary the air flow through the interior surface of the leaking pipe.

7. The method of internally restoring a pipe of claim 1, further comprising the step of:
  measuring the air flow through the at least one leak with an air flow meter.

8. A method of internally restoring a pipe, comprising the steps of:
  drying an interior surface of a leaking pipe;
  measuring air flow through at least one leak in the leaking pipe;
  cleaning the interior surface of the leaking pipe;
  pre-sealing the at least one leak with a dry leak sealing media by injecting the dry leak sealing media through an inlet of the leaking pipe;
  measuring air flow through the at least one leak;
  injecting through the inlet a metered amount of heated liquid coating into the interior surface at a specific air flow rate selected according to an inner diameter of the leaking pipe, to form a restored pipe; and
  testing the restored pipe by pressurizing thereof.

9. The method of internally restoring a pipe of claim 8, further comprising the step of:
  reducing curing time of the liquid coating by flowing heated air through the interior surface of the restored pipe.

10. The method of internally restoring a pipe of claim 8, further comprising the step of: adding fillers to the liquid coating, wherein the amount of said fillers are dependent upon the reduced leak air flow measurements.

11. The method of internally restoring a pipe of claim 8, further comprising the step of:
  inserting a clear tube before an inlet of the leaking pipe.

12. The method of internally restoring a pipe of claim 8, further comprising the step of:
  using a sand blasting media to clean the interior surface of the leaking pipe.

13. The method of internally restoring a pipe of claim 8, further comprising the step of:
  providing a control valve to vary the air flow through the interior surface of the leaking pipe.

14. The method of internally restoring a pipe of claim 8, further comprising the step of:
  measuring the air flow through the at least one leak with an air flow meter.

15. A method of internally restoring a pipe, comprising the steps of:
  separating a leaking pipe from a system of pipes;
  drying an interior surface of a leaking pipe;
  measuring air flow through at least one leak in the leaking pipe;
  cleaning the interior surface of the leaking pipe;
  pre-sealing the at least one leak with a dry leak sealing media by injecting the dry leak sealing media through an inlet of the leaking pipe;
  injecting through the inlet a metered amount of heated liquid coating into the interior surface at a specific air flow rate selected according to an inner diameter of the leaking pipe, to form a restored pipe; and
  testing the restored pipe by pressurizing thereof.

16. The method of internally restoring a pipe of claim 15, further comprising the step of:
  reducing curing time of the liquid coating by flowing heated air through the interior surface of the restored pipe.

17. The method of internally restoring a pipe of claim 15, further comprising the step of:
  adding fillers to the liquid coating, wherein the amount of said fillers are dependent upon the reduced leak air flow measurements.

18. The method of internally restoring a pipe of claim 15, further comprising the step of:
  inserting a clear tube before an inlet of the leaking pipe.

19. The method of internally restoring a pipe of claim 15, further comprising the step of:
  using a sand blasting media to clean the interior surface of the leaking pipe.

20. The method of internally restoring a pipe of claim 15, further comprising the step of:
  providing a control valve to vary the air flow through the interior surface of the leaking pipe.

* * * * *